(12) United States Patent
Fujita

(10) Patent No.: US 9,789,869 B2
(45) Date of Patent: Oct. 17, 2017

(54) DRIVING SUPPORT APPARATUS AND DRIVING SUPPORT METHOD

(71) Applicant: Yoshitaka Fujita, Susono (JP)

(72) Inventor: Yoshitaka Fujita, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 11 days.

(21) Appl. No.: 14/440,238

(22) PCT Filed: Nov. 8, 2012

(86) PCT No.: PCT/JP2012/079026
§ 371 (c)(1),
(2) Date: May 1, 2015

(87) PCT Pub. No.: WO2014/073079
PCT Pub. Date: May 15, 2014

(65) Prior Publication Data
US 2015/0274158 A1 Oct. 1, 2015

(51) Int. Cl.
*G01C 22/00* (2006.01)
*G05D 1/00* (2006.01)
*B60W 30/00* (2006.01)
*B62D 15/02* (2006.01)

(52) U.S. Cl.
CPC ........... *B60W 30/00* (2013.01); *B62D 15/025* (2013.01); *B60W 2600/00* (2013.01)

(58) Field of Classification Search
CPC .................................................. B62D 15/025
USPC .......................................................... 701/23
See application file for complete search history.

(56) References Cited

U.S. PATENT DOCUMENTS

| | | | |
|---|---|---|---|
| 2010/0222976 A1 | 9/2010 | Haug | |
| 2012/0212353 A1* | 8/2012 | Fung | ..................... B60K 28/06 340/905 |

FOREIGN PATENT DOCUMENTS

| | | |
|---|---|---|
| JP | 2002-367095 A | 12/2002 |
| JP | 2008-273521 A | 11/2008 |
| JP | 2008-285013 A | 11/2008 |
| JP | 2009-541888 A | 11/2009 |

* cited by examiner

*Primary Examiner* — Maceeh Anwari
(74) *Attorney, Agent, or Firm* — Sughrue Mion, PLLC

(57) ABSTRACT

The invention is equipped with a travelable range detection device that detects a travelable range of a vehicle, a traveling control device that controls the vehicle such that the vehicle travels in the travelable range detected by the travelable range detection device, a vehicle control device that controls a behavior of the vehicle, and a controller that executes control to suppress a controlled variable of the traveling control device until a driver's follow-up operation for causing the vehicle to follow the travelable range by the vehicle control device is detected after start of control of the traveling control device.

10 Claims, 10 Drawing Sheets

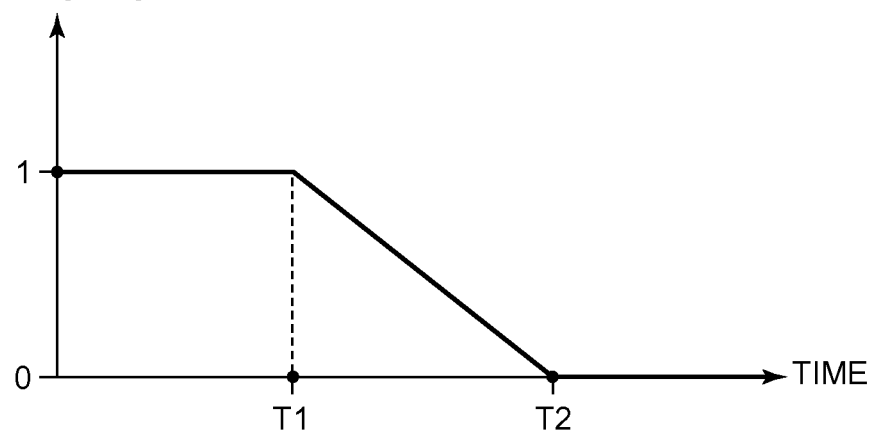
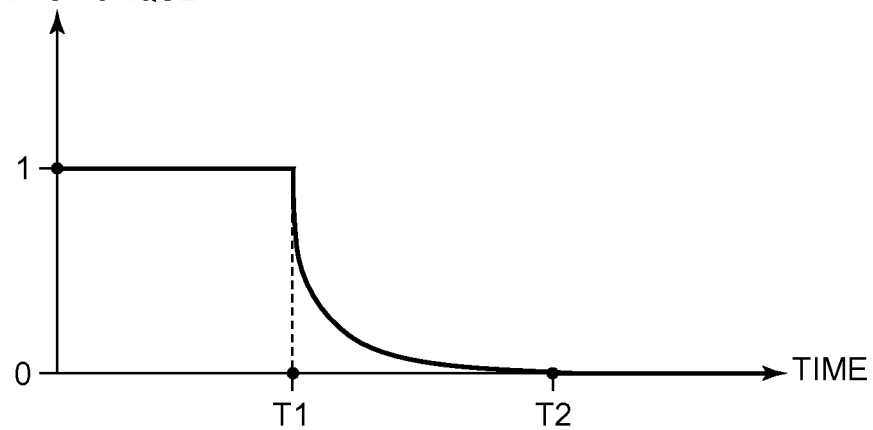

DRIVING SUPPORT APPARATUS AND DRIVING SUPPORT METHOD

TECHNICAL FIELD

The invention relates to a driving support apparatus and a driving support method.

BACKGROUND ART

Conventionally, there are technologies for stopping automatic driving unless a driver has performed a predetermined operation for continuing automatic driving for a certain time during automatic driving.

RELATED ART DOCUMENTS

Patent Documents

Patent Document 1: Published Japanese Translation of PCT Application No. 2009-541888 (JP 2009-541888 A)

Patent Document 2: Japanese Patent Application Publication No. 2002-367095 (JP 2002-367095 A)

Patent Document 3: Japanese Patent Application Publication No. 2008-273521 (JP 2008-273521 A)

Patent Document 4: Japanese Patent Application Publication No. 2008-285013 (JP 2008-285013 A)

SUMMARY OF THE INVENTION

Problem to be Solved by the Invention

However, according to the conventional technologies, the predetermined operation for continuing automatic driving is an operation other than a driving operation. The driver who concentrates on driving may feel bothered by this predetermined operation. In this manner, according to the conventional technologies, there is room for improvement in allowing the driver to concentrate on driving without being bothered during automatic driving.

The invention has been made in view of the aforementioned circumstances. It is an object of the invention to provide a driving support apparatus and a driving support method that allow a driver to concentrate on driving without being bothered during automatic driving.

Means for Solving the Problem

A driving support apparatus according to the invention is characterized by being equipped with a travelable range detection device that detects a travelable range of a vehicle, a traveling control device that controls the vehicle such that the vehicle travels in the travelable range detected by the travelable range detection device, a vehicle control device that controls a behavior of the vehicle, and a controller that executes control to suppress a controlled variable of the traveling control device until a follow-up operation by a driver with the vehicle control device for causing the vehicle to follow the travelable range is detected after start of control of the traveling control device.

In the aforementioned driving support apparatus, it is preferable that the controller suppresses the controlled variable of the traveling control device after start of control of the traveling control device, and continues control of the traveling control device by reducing a suppression degree of the controlled variable of the traveling control device when the follow-up operation is detected after suppression of the controlled variable.

In the aforementioned driving support apparatus, it is preferable that the controller suppresses the controlled variable of the traveling control device when a duration time of control of the traveling control device exceeds a first predetermined time or when a duration distance of control of the traveling control device exceeds a first predetermined distance, after start of control of the traveling control device.

In the aforementioned driving support apparatus, it is preferable that the vehicle control device include a steering wheel, that the traveling control device include a steering assist device that outputs a steering torque for assisting the driver in steering the steering wheel, and a variable steering angle control device that makes a wheel turning angle with respect to a steering angle of the steering wheel variable, and that the controller executes control to make the suppression degree of the controlled variable of the steering assist device larger than the suppression degree of the controlled variable of the variable steering angle control device in suppressing the controlled variable of the traveling control device.

In the aforementioned driving support apparatus, it is preferable that the variable steering angle control device include a variable front-wheel turning angle control device that makes a front-wheel turning angle with respect to the steering angle variable, and a variable rear-wheel turning angle control device that makes a rear-wheel turning angle with respect to the steering angle variable, and that the controller suppresses the controlled variable of the front-wheel turning angle by the variable front-wheel turning angle control device with the controlled variable of the rear-wheel turning angle by the variable rear-wheel turning angle control device maintained, and reduces the suppression degree of the controlled variable of the front-wheel turning angle by the variable front-wheel turning angle control device when the follow-up operation is detected after suppression of the controlled variable.

In the aforementioned driving support apparatus, it is preferable that the controller suppresses the controlled variable of the traveling control device such that the controlled variable of the traveling control device becomes equal to 0 at a time point when the duration time exceeds a second predetermined time that is longer than the first predetermined time or at a time point when the duration distance exceeds a second predetermined distance that is longer than the first predetermined distance after start of control of the traveling control device.

In the aforementioned driving support apparatus, it is preferable that a warning device that issues a warning to the driver be further provided, and that the controller makes the controlled variable of the traveling control device equal to 0 after issuance of the warning to the driver by the warning device, when the duration time becomes equal to or longer than the second predetermined time or when the duration distance becomes equal to or longer than the second predetermined distance.

In the aforementioned driving support apparatus, it is preferable that an awakening degree detection device that detects an awakening degree of the driver be further provided, and that the controller suppresses the controlled variable of the traveling control device in accordance with a decrease in the awakening degree detected by the awakening degree detection device.

In the aforementioned driving support apparatus, it is preferable that the controller issues a warning to the driver with the warning device until the awakening degree detected by the awakening degree detection device indicates an awakened state, when the awakening degree detected by the awakening degree detection device indicates an unawakened state, and makes the controlled variable of the traveling control device equal to 0 when a certain time elapses after the awakening degree indicates the awakened state.

Besides, a driving support method according to the invention is a driving support method that is carried out in a driving support apparatus that is equipped with a travelable range detection device that detects a travelable range of a vehicle, a traveling control device that controls the vehicle such that the vehicle travels in the travelable range detected by the travelable range detection device, a vehicle control device that controls a behavior of the vehicle, and a controller. The driving support method is characterized by including a control step that is executed in the controller to execute control to suppress a controlled variable of the traveling control device until a follow-up operation by a driver with the vehicle control device for causing the vehicle to follow the travelable range is detected after start of control of the traveling control device.

In the aforementioned driving support method, it is preferable that the control step include a suppression step for suppressing the controlled variable of the traveling control device after start of control of the traveling control device, and a continuation step for continuing control of the traveling control device by reducing a suppression degree of the controlled variable of the traveling control device when the follow-up operation is detected after suppression of the controlled variable.

In the aforementioned driving support method, it is preferable that the suppression step be designed to suppress the controlled variable of the traveling control device when a duration time of control of the traveling control device exceeds a first predetermined time or when a duration distance of control of the traveling control device exceeds a first predetermined distance after start of control of the traveling control device.

Effect of the Invention

The driving support apparatus and the driving support method according to the invention achieve an effect of allowing the driver to concentrate on driving without being bothered during automatic driving.

BRIEF DESCRIPTION OF THE DRAWINGS

FIG. 2 is a view showing an example of a suppression degree of a controlled variable of a variable steering angle control device.

FIG. 3 is a view showing an example of a suppression degree of a controlled variable of a steering assist device.

MODE FOR CARRYING OUT THE INVENTION

The embodiment of the invention will be described hereinafter in detail based on the drawings. Incidentally, this embodiment of the invention is not intended to limit this invention. Besides, the components in the following embodiment of the invention include those which are replaceable by persons skilled in the art and easy to conceive, or those which are substantially identical thereto.

Embodiment

Figure 1:
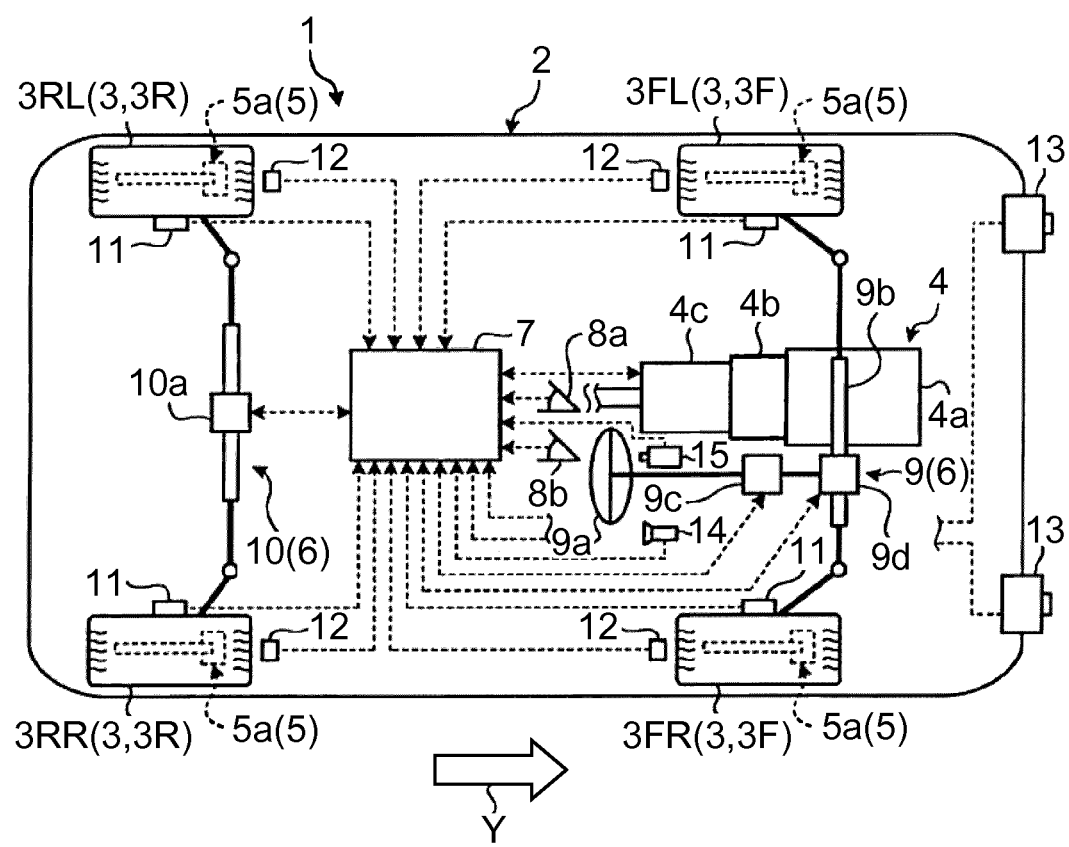
FIG. 1 is a schematic block diagram of a vehicle to which a driving support apparatus according to an embodiment of the invention is applied.

The configuration of the driving support apparatus according to the present embodiment of the invention will be described with reference to FIGS. 1 to 16. FIG. 1 is a schematic block diagram of a vehicle to which the driving support apparatus according to the embodiment of the invention is applied.

A driving support apparatus 1 according to the present embodiment of the invention is mounted in a vehicle 2 with four steered wheels as shown in FIG. 1. It should be noted herein that the vehicle 2 moves forward in a direction indicated by an arrow Y of FIG. 1. The direction in which the vehicle 2 moves forward is a direction from a driver seat in which a driver of the vehicle 2 sits to a steering wheel. A distinction between the right and the left is made with respect to the direction in which the vehicle 2 moves forward (the direction indicated by the arrow Y of FIG. 1). That is, the word "left" means the left side with respect to the direction in which the vehicle 2 moves forward, and the word "right" means the right side with respect to the direction in which the vehicle 2 moves forward. Besides, the front and rear of the vehicle 2 are defined as follows. The front means the direction in which the vehicle 2 moves forward. The rear means a direction in which the vehicle 2 moves backward, namely, the opposite direction of the direction in which the vehicle 2 moves forward.

The vehicle 2 is equipped with wheels 3, that is, a front-left wheel (the wheel 3 on a front-left side) 3FL, a front-right wheel (the wheel 3 on a front-right side) 3FR, a rear-left wheel (the wheel 3 on a rear-left side) 3RL, and a rear-right wheel (the wheel 3 on a rear-right side) 3RR. Incidentally, in the following description, "the wheels 3" will be mentioned simply in some cases when there is no particular need to give an explanation making a distinction among the front-left wheel 3FL, the front-right wheel 3FR, the rear-left wheel 3RL, and the rear-right wheel 3RR. Besides, in the following description, "the front wheels 3F" will be mentioned simply in some cases when there is no particular need to give an explanation making a distinction between the front-left wheel 3FL and the front-right wheel 3FR. By the same token, in the following description, "the rear wheels 3R" will be mentioned simply in some cases when there is no particular need to give an explanation making a distinction between the rear-left wheel 3RL and the rear-right wheel 3RR.

This driving support apparatus 1 is an apparatus that is mounted with a steering device 6 as an actuator capable of steering the front wheels 3F and the rear wheels 3R of the vehicle 2, and the like. Typically, the driving support apparatus 1 arbitrarily controls a vehicle body slip angle posture in response to steering, in the vehicle 2 that is mounted with the steering device 6 as a four-wheel steering mechanism that is constituted of a front-wheel steering device 9, a rear-wheel steering device 10, and the like.

More specifically, as shown in FIG. 1, the driving support apparatus 1 is equipped with a drive device 4, a braking device 5, the steering device 6, and an electronic control unit (an ECU) 7 as a controller.

The drive device 4 constitutes a power train including a motive power source 4a, a torque converter 4b, a transmission 4c and the like in the vehicle 2, and rotationally drives the wheels 3 serving as driving wheels. The motive power source 4a generates a rotational motive power for causing the vehicle 2 to travel, and is a motive power source for traveling such as an internal combustion engine (an engine), an electric motor (a rotator) or the like. The drive device 4 transmits a motive power generated by the motive power source 4a from the motive power source 4a to the wheels 3 (e.g., the rear-left wheel 3RL and the rear-right wheel 3RR as driving wheels) via the torque converter 4b, the transmission 4c and the like. The drive device 4 is electrically connected to the ECU 7, and is controlled by this ECU 7. In the vehicle 2, the drive device 4 generates a motive power (a torque) in accordance with an operation of an accelerator pedal 8a (an accelerator operation) by the driver, and this motive power is transmitted to the wheels 3, so a driving force is generated in the wheels 3.

The braking device 5 generates a braking force applied to the wheels 3 in the vehicle 2. The braking device 5 has braking units 5a that are provided on the wheels 3 respectively. Each of the braking units 5a applies a braking force to a corresponding one of the wheels 3 of the vehicle 2 through friction, and is, for example, a hydraulic brake device. Each of the braking units 5a operates in accordance with a wheel cylinder pressure resulting from a brake oil that is supplied to a wheel cylinder, and generates a pressure braking force applied to a corresponding one of the wheels 3. The braking device 5 applies a master cylinder pressure to the brake oil by a master cylinder, in response to the driver's operation of a brake pedal 8b (a brake operation). Then, in the braking device 5, a pressure corresponding to this master cylinder pressure or a pressure regulated by a hydraulic control device acts as a wheel cylinder pressure in each of the wheel cylinders. In each of the braking units 5a, a brake pad that is supported by a caliper is abutted against and pressed against a disc rotor by the wheel cylinder pressure, so an abutment surface of the brake pad and the disc rotor serves as a frictional surface. Then, a predetermined rotational resistance force corresponding to the wheel cylinder pressure is applied to the disc rotor that rotates together with each of the wheels 3, due to a frictional force that is generated on the frictional surface. Thus, each of the braking units 5a can apply a braking force to a corresponding one of the wheels 3 through friction.

The steering device 6 can steer the front wheels 3F and the rear wheels 3R of the vehicle 2. In this case, the steering device 6 is configured to include a front-wheel steering device 9 and a rear-wheel steering device 10. The front-wheel steering device 9 can steer the front wheels 3F of the vehicle 2, and steers the front-left wheel 3FL and the front-right wheel 3FR as steered wheels. The rear-wheel steering device 10 can steer the rear wheels 3R of the vehicle 2, and steers the rear-left wheels 3RL and the rear-right wheels 3RR as steered wheels. In the present embodiment of the invention, the steering device 6 functions as a traveling control device that controls the vehicle 2 such that the vehicle 2 travels in a travelable range that is detected by a front detection device 13, which will be described later. In the following description, the steering device 6 will be referred to as the traveling control device in some cases.

Typically, the front-wheel steering device 9 is equipped with a steering wheel 9a as a steering member that is a steering controller operated by the driver, and a turning angle application mechanism 9b that is driven in response to a steering operation of this steering wheel 9a and that turns the front wheels 3F. In the present embodiment of the invention, the steering wheel 9a functions as a vehicle control device that controls the behavior of the vehicle. In the following description, the steering wheel 9a will be referred to as the vehicle control device in some cases. As the turning angle application mechanism 9b, for example, a so-called rack-and-pinion mechanism that is equipped with a rack gear and a pinion gear, or the like can be employed, but the turning angle application mechanism 9b is not limited thereto. Furthermore, the front-wheel steering device 9 is configured to include a variable gear ratio steering (VGRS) device 9c that is provided between the steering wheel 9a and the turning angle application mechanism 9b, a steering driver (a booster) 9d for the front wheels, and the like. The VGRS device 9c is a variable gear ratio steering mechanism that can change the gear ratio of the steering wheel 9a. The front-wheel steering device 9 can change a turning angle of the front wheels 3F (hereinafter referred to as "a front-wheel turning angle" in some cases) with respect to a steering wheel steering angle (a turning angle) as an operation amount of the steering wheel 9a, in accordance with a driving state of the vehicle 2 (e.g., a vehicle speed as a traveling speed of the vehicle 2) by, for example, the VGRS device 9c. In the present embodiment of the invention, the VGRS device 9c functions as a variable steering angle control device that makes a wheel turning angle with respect to a steering angle of the steering wheel 9a variable, and more specifically, functions as a variable front-wheel turning angle control device that makes a front-wheel turning angle with respect to a steering angle variable. In the following description, the VGRS device 9c will be referred to as the variable steering angle control device or the variable front-wheel turning angle control device in some cases. The steering driver (the steering assist device) 9d is a so-called electric power steering device (an electric power steering (EPS) device) that assists a steering force applied to the steering wheel 9a from the driver, by a motive power of the electric motor or the like (a steering assist force). In the present embodiment of the invention, the steering driver 9d functions as a steering assist device that outputs a steering torque for assisting the driver in steering the steering wheel 9a. In the following description, the steering driver 9d will be referred to as the steering assist device in some cases. The front-wheel steering device 9 is electrically controlled to the ECU 7, and the VGRS device 9c, the steering driver 9d, and the like are controlled by this ECU 7.

The rear-wheel steering device 10 is a so-called active rear steering (ARS) device. The rear-wheel steering device 10 is equipped with a steering driver 10a for rear wheels that is driven by a motive power of the electric motor or the like and that turns the rear wheels 3R. As is the case with the front-wheel steering device 9, the rear-wheel steering device 10 can change a turning angle of the rear wheels 3R with respect to a steering wheel steering angle (hereinafter referred to as "a rear-wheel turning angle" in some cases) in accordance with a driving state of the vehicle 2 (e.g., a vehicle speed) by, for example, the steering driver 10a. In the present embodiment of the invention, the steering driver 10a functions as a variable steering angle control device, and more specifically, functions as a variable rear-wheel turning angle control device that makes a rear-wheel turning angle with respect to a steering angle variable. In the following description, the steering driver 10a will be referred to as the variable steering angle control device or the variable rear-wheel turning angle control device in some cases. The rear-wheel steering device 10 is electrically connected to the ECU 7, and the steering driver 10a and the like are controlled by this ECU 7. The rear-wheel steering device 10 steers the rear wheels 3R in a phase identical or reverse to a turning angle of the front wheels 3F in accordance with a driving state of the vehicle 2 (e.g., a vehicle speed or a turning state) by, for example, the ECU 7.

In the driving support apparatus 1, the steering device 6 as a four-wheel steering mechanism is constituted by the front-wheel steering device 9 and the rear-wheel steering device 10 as described above. The rear-left wheel 3RL and the rear-right wheel 3RR as well as the front-left wheel 3FL and the front-right wheel 3FR are steered wheels. Besides, the front-wheel steering device 9 and the rear-wheel steering device 10 can also change the turning angles of the front wheels 3F and the rear wheels 3R regardless of the driver's steering operation through control of the ECU 7.

Besides, this steering device 6 is also an actuator that can adjust the vehicle body slip angle of the vehicle 2. It should be noted herein that the vehicle body slip angle is an angle that is formed by a longitudinal centerline (in the direction of a vehicle body) of the vehicle body of the vehicle 2 and a advancing direction of the vehicle body of the vehicle 2 (a speed vector), and is, for example, an angle that is formed by the longitudinal centerline of the vehicle body of the vehicle 2 with respect to a turning tangential direction of the vehicle 2. The vehicle body slip angle is, for example, 0 (rad) in a state where the longitudinal centerline of the vehicle body and the advancing direction of the vehicle body coincide with each other. The vehicle body slip angle of the present embodiment of the invention is determined in accordance with, for example, the front-wheel turning angle of the vehicle 2, the rear-wheel turning angle of the vehicle 2, or the like. As will be described later, the steering device 6 can adjust the vehicle body slip angle of the vehicle 2 by adjusting the front-wheel turning angle and the rear-wheel turning angle.

The ECU 7 is a controller that controls driving of respective units of the vehicle 2, and is configured to include an electronic circuit that is mainly constituted of a known microcomputer that includes a CPU, a ROM, a RAM, and an interface. For example, various sensors, detectors and the like are electrically connected to the ECU 7, and electric signals corresponding to detected results are input to the ECU 7. Then, the ECU 7 outputs drive signals to the respective units of the vehicle 2 such as the drive device 4, the braking device 5, the front-wheel steering device 9, the rear-wheel steering device 10 and the like, and controls the driving of these devices, by executing a stored control program based on various maps and various input signals input from the various sensors, the detectors and the like.

The driving support apparatus 1 according to the present embodiment of the invention is equipped with, for example, wheel speed sensors 11, wheel cylinder pressure sensors 12, the front detection device 13 and the like, as the various sensors and the detectors. A total of the four wheel speed sensors 11 are provided for the front-left wheel 3FL, the front-right wheel 3FR, the rear-left wheel 3RL, and the rear-right wheel 3RR respectively. Each of the wheel speed sensors 11 detects a wheel speed as a rotational speed of a corresponding one of the front-left wheel 3FL, the front-right wheel 3FR, the rear-left wheel 3RL, and the rear-right wheel 3RR. The ECU 7 can calculate a vehicle speed as a traveling speed of the vehicle 2, based on wheel speeds of the respective wheels 3 input from the respective wheel speed sensors 11. A total of the four wheel cylinder pressure sensors 12 are provided for the braking units 5a of the front-left wheel 3FL, the front-right wheel 3FR, the rear-left wheel 3RL, and the rear-right wheel 3RR respectively. Each of the wheel cylinder pressure sensors 12 detects a wheel cylinder pressure of a corresponding one of the braking units 5a of the front-left wheel 3FL, the front-right wheel 3FR, the rear-left wheel 3RL, and the rear-right wheel 3RR. The front detection device 13 detects a situation on a front side in the advancing direction of the vehicle 2 (the direction along a forward direction Y). As the front detection device 13, an image recognition device that detects a situation on the front side in the advancing direction of the vehicle 2 by analyzing image data that are obtained by photographing an area in front of the vehicle 2 in the traveling direction thereof by a photographing device, for example, a millimeter wave radar, a radar using laser rays, infrared rays and the like, a short-distance radar such as an ultra-wide band (UWB) radar or the like, a sonar using sonic waves in an audible range or ultrasonic waves, a CCD camera or the like, or the like may be employed. The front detection device 13 may detect, for example, at least one of the presence/absence of a peripheral object on the front side in the advancing direction of the vehicle 2 (an obstacle, a preceding vehicle, or the like), a relative physical quantity indicating a relative positional relationship between the detected peripheral object and the vehicle 2, a shape of a road on which the vehicle 2 travels, a traveling lane (a lane), and the like. In the present embodiment of the invention, the front detection device 13 functions as a travelable range detection device that detects a travelable range of the vehicle 2. It should be noted herein that the travelable range means, for example, a range in which the vehicle 2 can travel in consideration of traveling lanes, guardrails, obstacles and the like. In the following description, the front detection device 13 will be referred to as the travelable range detection device in some cases.

Besides, an electric signal corresponding to a steering wheel steering angle (a turning angle) that is detected by the steering wheel steering angle sensor is input to the ECU 7 from the VGRS device 9c. The steering wheel steering angle is a steering angle of the steering wheel 9a (a rotational angle of the steering wheel 9a). Besides, an electric signal corresponding to a front-wheel turning angle that is detected by the front-wheel turning angle sensor is input to the ECU 7 from the steering driver 9d. The front-wheel turning angle is a turning angle of the front wheels 3F (a rotational angle of the front wheels 3F). By the same token, an electric signal corresponding to a rear-wheel turning angle that is detected by the rear-wheel turning angle sensor is input to the ECU 7 from the steering driver 10a. The rear-wheel turning angle is a turning angle of the rear wheels 3R (a rotational angle of the rear wheels 3R).

Then, the ECU 7 controls the front-wheel steering device 9 and the rear-wheel steering device 10 in accordance with, for example, preset vehicle body slip angle characteristics of the vehicle 2, steers the front wheels 3F and the rear wheels 3R, and changes the front-wheel turning angle and the rear-wheel turning angle. The ECU 7 calculates a target yaw rate and a target vehicle body slip angle based on, for example, a steering wheel steering angle, a vehicle speed, and the like. This target yaw rate and this target vehicle body slip angle are a yaw rate and a vehicle body slip angle that are regarded as targets in executing steering control of the front-wheel steering device 9 and the rear-wheel steering device 10, respectively, and set to, for example, values for stabilizing the behavior of the vehicle 2 respectively. Then, the ECU 7 calculates a controlled variable of the front-wheel turning angle and a controlled variable of the rear-wheel turning angle such that the calculated target yaw rate and the calculated target vehicle body slip angle can be realized. The ECU 7 inversely calculates the controlled variable of the front-wheel turning angle and the controlled variable of the rear-wheel turning angle from the target yaw rate and the target vehicle body slip angle, using, for example, a vehicle model of the vehicle 2 that is stored in a storage unit in advance. Then, the ECU 7 outputs a control command to the front-wheel steering device 9 and the rear-wheel steering device 10 based on the calculated controlled variable of the front-wheel turning angle and the calculated controlled variable of the rear-wheel turning angle. The ECU 7 executes feedback control of an actual front-wheel turning angle and an actual rear-wheel turning angle, which are detected by the front-wheel turning angle sensor of the steering driver 9d and the rear-wheel turning angle sensor of the steering driver 10a respectively, and controls the front-wheel steering device 9 and the rear-wheel steering device 10 such that the actual yaw rate and the actual vehicle body slip angle converge to the target yaw rate and the target vehicle body slip angle. As a result, the vehicle 2 can travel while the front wheels 3F and the rear wheels 3R are steered by the front-wheel steering device 9 and the rear-wheel steering device 10 respectively in accordance with predetermined vehicle body slip angle characteristics.

Still further, the ECU 7 can also execute automatic driving control for controlling the vehicle 2 through automatic driving. The ECU 7 can execute automatic driving control by controlling the vehicle 2 based on, for example, a detected result of the front detection device 13. Automatic driving control is, for example, trajectory control for generating a target trajectory based on the detected result of the front detection device 13 and controlling the front-wheel steering device 9 and the rear-wheel steering device 10 based on the target trajectory. The ECU 7 generates a target trajectory as a traveling trajectory that is regarded as a target of the vehicle 2, in a travelable range based on the presence/absence of a peripheral object (an obstacle) on the front side in the advancing direction of the vehicle 2 as detected by the front detection device 13, a relative physical quantity of the peripheral object and the vehicle 2, a shape of a road on which the vehicle 2 travels, a traveling lane, a guardrail and the like. The ECU 7 generates a target trajectory of the vehicle 2 in accordance with, for example, a traveling trajectory (a lane keeping assist) for causing the vehicle 2 as a host vehicle to travel while remaining in the present traveling lane, a traveling trajectory for avoiding the obstacle on the front side in the advancing direction of the vehicle 2, a traveling trajectory for causing the vehicle 2 to follow a preceding vehicle, and the like. Then, the ECU 7 controls the front-wheel steering device 9 and the rear-wheel steering device 10 such that the vehicle 2 advances in an advancing direction and a posture that correspond to the generated target trajectory. In this case, the ECU 7 calculates a target yaw rate and a target vehicle body slip angle based on, for example, indices regarding the generated target trajectory (e.g., a turning radius corresponding to the target trajectory, a distance to the obstacle, a lateral target moving distance and the like) as well as the aforementioned steering wheel steering angle and the aforementioned vehicle speed. Then, in the same manner as described above, the ECU 7 controls the front-wheel steering device 9 and the rear-wheel steering device 10 through the controlled variable of the front-wheel turning angle and the controlled variable of the rear-wheel turning angle, which are based on the calculated target yaw rate and the calculated target vehicle body slip angle. As a result, the vehicle 2 can travel along the target trajectory while the front wheels 3F and the rear wheels 3R are steered in accordance with the vehicle body slip angle characteristics by the front-wheel steering device 9 and the rear-wheel steering device 10 respectively.

Besides, the ECU 7 can also execute automatic driving control, for example, auto cruise traveling for automatically controlling the vehicle speed to a predetermined vehicle speed, automatic follow-up traveling for automatically following a preceding vehicle with a certain vehicle-to-vehicle distance therefrom, automatic control of the stoppage and start of the vehicle in accordance with a lighting situation of a traffic light on the front side in the advancing direction or a position of a stop line, and the like. Incidentally, the driving support apparatus 1 can change over the turning on/off of automatic driving control arbitrarily in accordance with the intention of the driver, for example, as the driver performs a changeover operation via a predetermined changeover switch.

It should be noted herein that the driving support apparatus 1 according to the present embodiment of the invention executes control to hold the driver in a driveable state even during automatic driving, in order to prevent the driver from overestimating automatic driving control. For example, the driving support apparatus 1 is set to stop automatic driving control upon issuing a warning to the driver after the lapse of a certain time since the start of automatic driving control through an operation of turning on the changeover switch. The warning is issued to the driver by a speaker 14 that outputs a predetermined message for advising the driver that automatic driving control should be stopped, or a warning sound. In the present embodiment of the invention, the speaker 14 functions as a warning device that issues a warning to the driver. In the present embodiment of the invention, the speaker 14 will be referred to as the warning device in some cases. Incidentally, the driver may be warned by causing a display unit (a meter panel or the like) that is installed at a position that is easy for the driver to visually recognize, to display a warning for stopping automatic driving control.

In this case, the driver can continue automatic driving control by, for example, performing a predetermined operation of turning on the changeover switch again after automatic driving control is stopped. However, the driver, who concentrates on driving, may feel bothered by the predetermined operation other than this driving operation. Thus, the ECU 7 of the driving support apparatus 1 according to the present embodiment of the invention executes control such that the driver's follow-up operation for causing the vehicle to follow the travelable range becomes easier to be detected, by reducing the amount of support in automatic driving when there is no driving operation. That is, the ECU 7 of the driving support apparatus 1 according to the present embodiment of the invention executes control to suppress the controlled variable of the traveling control device until the driver's follow-up operation for causing the vehicle to follow the travelable range by the vehicle control device is detected after the start of the control of the traveling control device (i.e., automatic driving control). The control of the traveling control device mentioned herein is automatic driving control for controlling the vehicle 2 such that the vehicle 2 travels in the travelable range detected by the travelable range detection device. Then, the driving support apparatus 1 according to the present embodiment of the invention executes control to gradually reduce the amount of support in automatic driving to make the driver's follow-up operation for causing the vehicle to follow the travelable range easier to be detected, and to continue automatic driving when there is a steering input from the driver. Thus, the driving support apparatus 1 according to the present embodiment of the invention allows the driver to concentrate on driving without being bothered during automatic driving.

More specifically, the ECU 7 of the driving support apparatus 1 according to the present embodiment of the invention suppresses the controlled variable of the traveling control device after starting control of the traveling control device, and reduces the suppression degree of the controlled variable of the traveling control device when a follow-up operation is detected after suppression of the controlled variable, thus continuing control of the traveling control device. In the present embodiment of the invention, suppression of the controlled variable of the traveling control device is a processing for reducing the follow-up performance of the travelable range through automatic driving control. The controlled variable of the traveling control device is suppressed, so the follow-up performance of the travelable range through automatic driving control decreases. Therefore, the driver needs to perform a follow-up operation for causing the vehicle to follow the travelable range. Then, when the driver's follow-up operation is detected, the driving support apparatus 1 reduces the suppression degree of the controlled variable of the traveling control device, and thereby executes control to continue automatic driving control longer than a preset end time of automatic driving control. It should be noted herein that reducing the suppression degree of the controlled variable of the traveling control apparatus includes, for example, returning the controlled variable to a normal value, increasing the controlled variable, maintaining the controlled variable, making a change such that the suppression degree of the controlled variable becomes gentle, and the like. The exemplification of the pattern of reducing the suppression degree of the controlled variable will be described later.

Besides, the driving support apparatus 1 according to the present embodiment of the invention may not immediately suppress the controlled variable of the traveling control device after the start of control of the traveling control device, and may suppress the controlled variable of the traveling control device after the lapse of a certain time. For example, the ECU 7 of the driving support apparatus 1 according to the present embodiment of the invention may suppress the controlled variable of the traveling control device when the duration time of control of the traveling control device exceeds a first predetermined time or when the duration distance of control of the traveling control device exceeds a first predetermined distance after the start of control of the traveling control device. In this case, the ECU 7 suppresses the controlled variable of the traveling control device such that the controlled variable of the traveling control device becomes equal to 0 at a time point when the duration time exceeds a second predetermined time longer than the first predetermined time or at a time point when the duration distance exceeds a second predetermined distance longer than the first predetermined distance after the start of control of the traveling control device. It should be noted herein that the ECU 7 makes the controlled variable of the traveling control device equal to 0 after warning the driver with the warning device when the duration time becomes equal to or longer than the second predetermined time or when the duration distance becomes equal to or longer than the second predetermined distance. In the present embodiment of the invention, the state where the controlled variable of the traveling control device is 0 means a state where control of the traveling control device substantially ends due to the controlled variable being 0 but control of the traveling control device has not completely stopped. In this case, control of the traveling control device is resumed, for example, if the controlled variable is increased in response to detection of the driver's follow-up operation after the controlled variable becomes equal to 0. In the case where control of the traveling control device is completely stopped, the driver may perform a turn-off operation through the aforementioned changeover switch.

In the present embodiment of the invention, the first predetermined time (an automatic driving duration time threshold T1) is arbitrarily determined based on the second predetermined time (an automatic driving duration time threshold T2) that is set in advance as a time that allows the driver to concentrate on driving. For example, if the second predetermined time is 2 hours (T2=2(H)), the first predetermined time may be set to 1.5 hours from T1=T2−0.5 (H). This first predetermined time and this second predetermined time can be replaced by the first predetermined distance that can be traveled by the vehicle 2 in the first predetermined time and the second predetermined distance that can be traveled by the vehicle 2 in the second predetermined time, respectively, so as to be comparable with the duration distance of control of the traveling control device.

As described hitherto, the driving support apparatus 1 according to the present embodiment of the invention executes control to gradually reduce the amount of support in automatic driving when the duration time (or the duration distance) of automatic driving becomes equal to or longer than the first predetermined time (the first predetermined distance), and to reduce the suppression degree of the amount of support in automatic driving (e.g., to return the suppression degree of the amount of support in automatic driving to a normal value) when the driver's follow-up operation for causing the vehicle to follow the travelable range is then detected and it is determined that vehicle behavior control by the driver (lane keeping, a turning operation or the like) has been possible. Then, the driving support apparatus 1 executes control to end support by automatic driving and return to manual driving after warning the driver when the duration time (or the duration distance) of automatic driving becomes equal to or longer than the second predetermined time (or the second predetermined distance) that is longer than the first predetermined time (or the first predetermined distance). Thus, the driving support apparatus 1 according to the present embodiment of the invention can safely carry out automatic driving without allowing the driver to be transiently relaxed, by ending automatic driving upon the lapse of a certain time. Furthermore, the driving support apparatus 1 according to the present embodiment of the invention can also change over swiftly to automatic driving when it is determined that the control of the behavior of the vehicle has been possible after the end of automatic driving. Thus, the driving support apparatus 1 according to the present embodiment of the invention can also reduce the bother felt by the driver upon resumption of automatic driving, by making an operation of reactivating automatic driving (a switch operation or the like) by the driver unnecessary.

In the present embodiment of the invention, a determination on the awakening degree of the driver is made depending on whether or not the driver performs a follow-up operation in response to a decrease in the controlled variable of the traveling control device (i.e., the amount of support in automatic driving). Therefore, in the processing of gradually reducing the controlled variable of the traveling control device, a sudden change in the controlled variable of the steering angle (the turning angle) of the traveling control device influences the behavior of the vehicle. Therefore, as shown in FIG. 2, it is desirable to linearly and gradually change the controlled variable of the steering angle (the turning angle) of the traveling control device after the lapse of T1. FIG. 2 is a view showing an example of the suppression degree of the controlled variable of the variable steering angle control device. Besides, it is desirable to change the controlled variable of the steering torque in a quadratic curve manner after the lapse of T1 as shown in FIG. 3, so that the driver finds it easy to recognize the controlled variable of the steering torque. FIG. 3 is a view showing an example of the suppression degree of the controlled variable of the steering assist device. Thus, the ECU 7 of the driving support apparatus 1 according to the present embodiment of the invention executes control to make the suppression degree of the controlled variable of the steering assist device (see FIG. 3) larger than the suppression degree of the controlled variable of the variable steering angle control device (see FIG. 2) in suppressing the controlled variable of the traveling control device. Thus, the driving support apparatus 1 according to the present embodiment of the invention can advise the driver of a decrease in support while suppressing the influence of the behavior of the vehicle.

Figure 4:
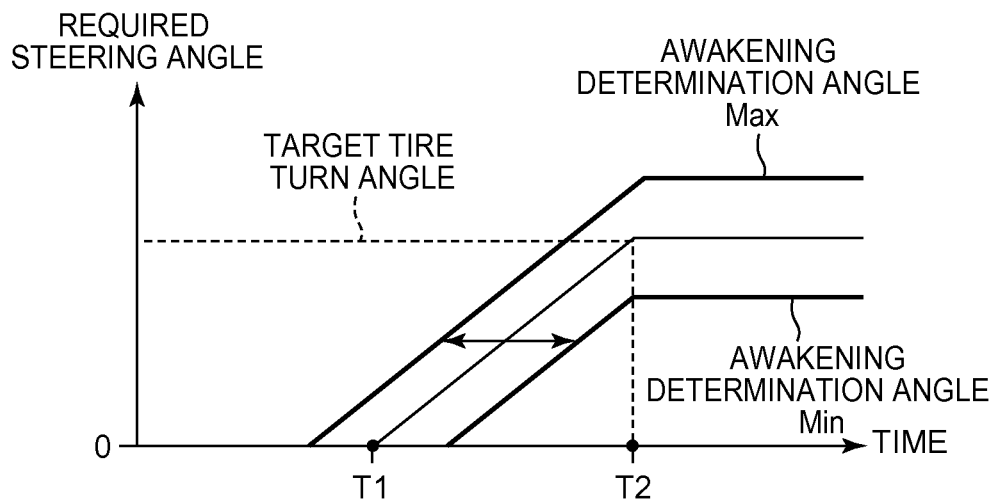
FIG. 4 is a view showing an example of a determination map of an awakening degree of a driver based on a steering angle of the driver.
Figure 5:
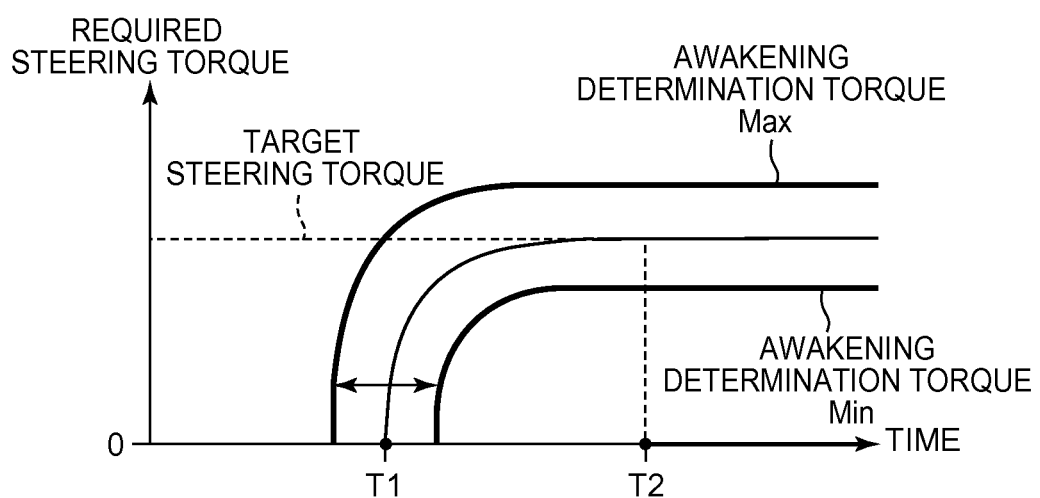
FIG. 5 is a view showing an example of a determination map of an awakening degree of the driver based on a steering torque of the driver.

A processing of making a determination on the awakening degree of the driver based on the driver's follow-up operation by the driving support apparatus 1 according to the present embodiment of the invention will now be described. In the driving support apparatus 1 according to the present embodiment of the invention, it is determined that the driver is in an awakened state when a modified steering amount of the driver needed by the processing of gradually changing the controlled variable of the traveling control device is appropriate. In this case, in the present embodiment of the invention, the required operation amount of the driver is defined as follows based on "controlled variable×target control angle or target control torque". For example, the required steering angle is defined as "required steering angle=target tire turning angle−(gradual reduction controlled variable×actuator execution angle)", and the required steering torque is defined as "required steering torque=target steering torque−(gradual reduction controlled variable×actuator execution torque)". Then, the driving support apparatus 1 according to the present embodiment of the invention determines that the driver is in an awakened state when the steering amount of the driver or the steering angle of the driver has lasted for a predetermined time within a predetermined offset amount (a range indicated by an arrow in each of FIGS. 4 and 5) as to the target tire turning angle thus obtained and the target steering torque thus obtained. FIG. 4 is a view showing an example of a determination map of the awakening degree of the driver based on the steering angle of the driver. FIG. 5 is a view showing an example of a determination map of the awakening degree of the driver based on the steering torque of the driver. More specifically, the driving support apparatus 1 according to the present embodiment of the invention determines whether or not a condition 1: the time of fulfillment of "awakening determination angle Min≤steering angle of driver≤awakening determination angle Max"≥determination threshold (sec) is fulfilled, as to the target tire turning angle shown in FIG. 4. Then, the driving support apparatus 1 determines that the driver is in an awakened state when this condition 1 is fulfilled, and determines that the driver is not in an awakened state when this condition 1 is not fulfilled. Alternatively, the driving support apparatus 1 according to the present embodiment of the invention determines whether or not a condition 2: the time of fulfillment of "awakening determination torque Min≤steering torque of driver≤awakening determination torque Max" determination threshold (sec) is fulfilled, as to the target steering torque shown in FIG. 5. Then, the driving support apparatus 1 determines that the driver is in an awakened state when this condition 2 is fulfilled, and determines that the driver is not in an awakened state when this condition 2 is not fulfilled.

When it is determined based on the driver's follow-up operation that the driver is in an awakened state, the driving support apparatus 1 according to the present embodiment of the invention reduces the suppression degree of the controlled variable of the traveling control device, thereby continuing control of the traveling control device. A pattern of reducing the suppression degree of the controlled variable of the traveling control device will now be exemplified, but the invention is not limited thereto.

Figure 6:
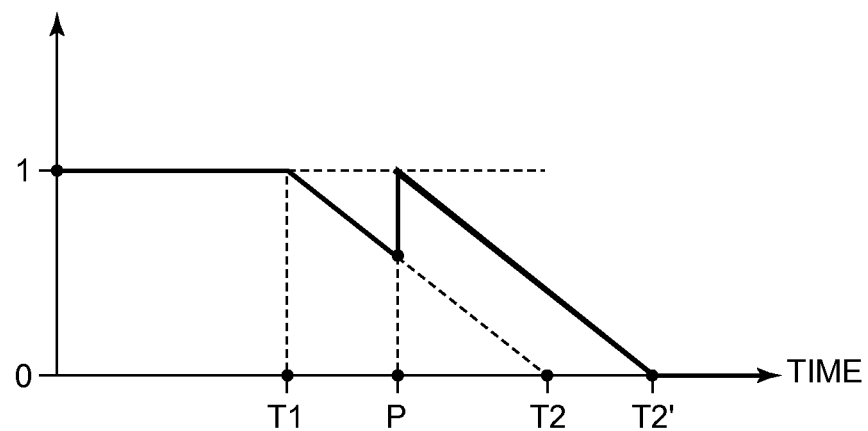
FIG. 6 is a view showing an example of a pattern of reducing the suppression degree for returning the controlled variable of the variable steering angle control device to a normal value.
Figure 7:
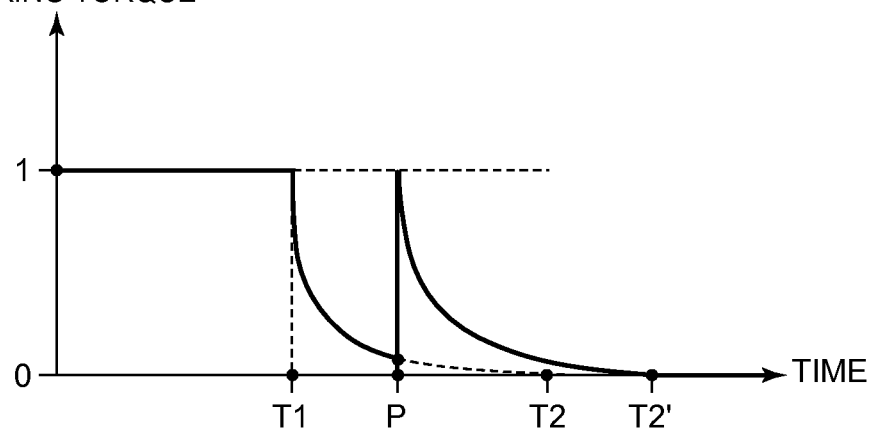
FIG. 7 is a view showing an example of a pattern of reducing the suppression degree for returning the controlled variable of the steering assist device to a normal value.
Figure 8:
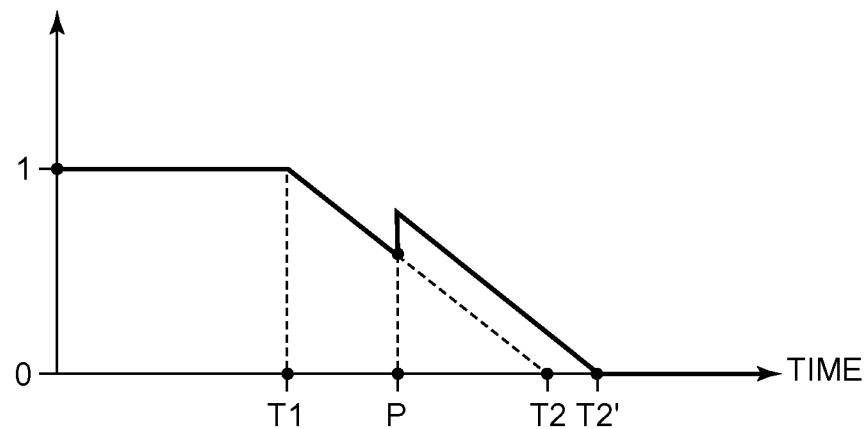
FIG. 8 is a view showing an example of a pattern of reducing the suppression degree for increasing the controlled variable of the variable steering angle control device.
Figure 9:
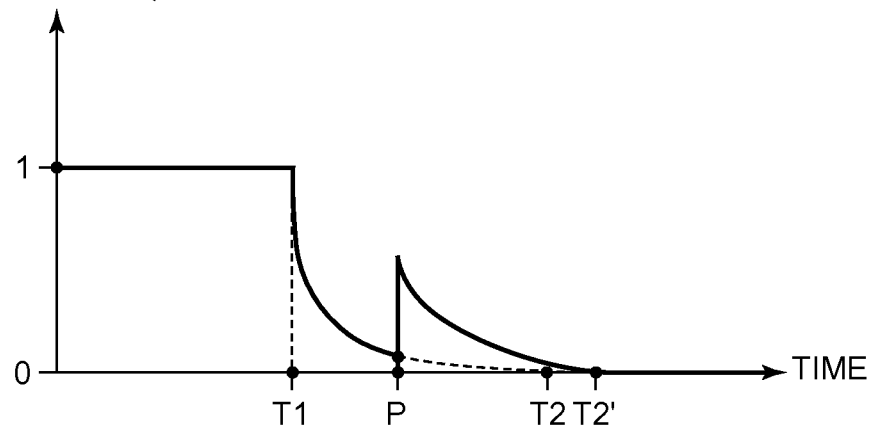
FIG. 9 is a view showing an example of a pattern of reducing the suppression degree for increasing the controlled variable of the steering assist device.

For example, when it is determined based on the driver's follow-up operation that the driver is in an awakened state, the driving support apparatus 1 according to the present embodiment of the invention may continue control of the traveling control device by returning the controlled variable to a normal value as shown in FIGS. 6 and 7. FIG. 6 is a view showing an example of a pattern of reducing the suppression degree for returning the controlled variable of the variable steering angle control device to a normal value. FIG. 7 is a view showing an example of a pattern of reducing the suppression degree for returning the controlled variable of the steering assist device to a normal value. In FIGS. 6 and 7, the driving support apparatus 1 extends a preset end time T2 of automatic driving control to an end time T2' such that automatic driving control lasts longer than the end time T2, by returning the controlled variable of the steering angle and the controlled variable of the steering torque to normal values respectively at a follow-up operation detection time point P. Besides, when it is determined based on the driver's follow-up operation that the driver is in an awakened state, the driving support apparatus 1 according to the present embodiment of the invention may continue control of the traveling control device by increasing the controlled variable as shown in FIGS. 8 and 9. FIG. 8 is a view showing an example of a pattern of reducing the suppression degree for increasing the controlled variable of the variable steering angle control device. FIG. 9 is a view showing an example of a pattern of reducing the suppression degree for increasing the controlled variable of the steering assist device. In FIGS. 8 and 9, the driving support apparatus 1 extends the preset end time T2 of automatic driving control to the end time T2' such that automatic driving control lasts longer than the end time T2, by increasing the controlled variable of the steering angle and the controlled variable of the steering torque by a certain amount at the follow-up operation detection time point P.

Figure 10:
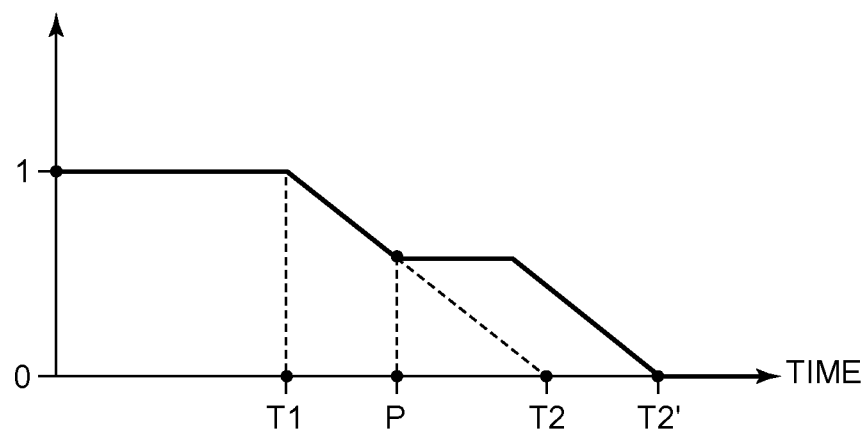
FIG. 10 is a view showing an example of a pattern of reducing the suppression degree for maintaining the controlled variable of the variable steering angle control device.
Figure 11:
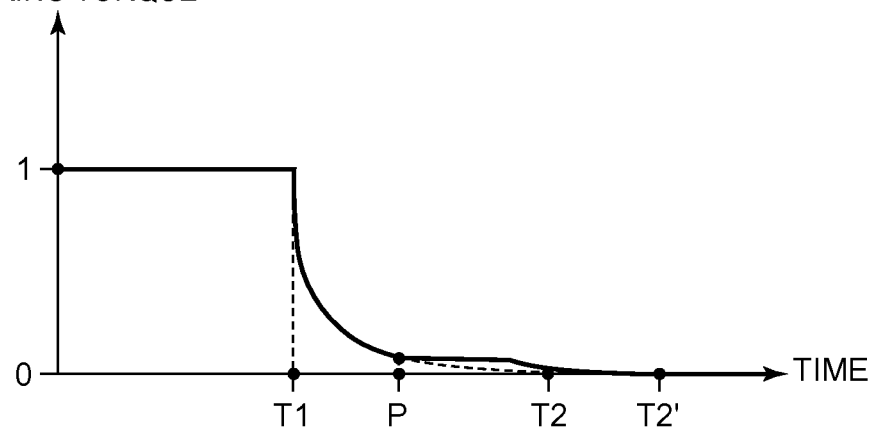
FIG. 11 is a view showing an example of a pattern of reducing the suppression degree for maintaining the controlled variable of the steering assist device.
Figure 12:
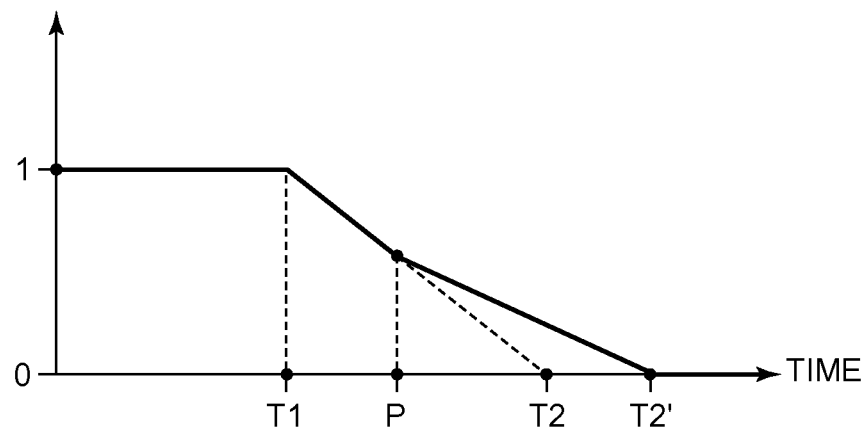
FIG. 12 is a view showing an example of a pattern of reducing the suppression degree for making a change such that a variation in the controlled variable of the variable steering angle control device becomes gentle.
Figure 13:
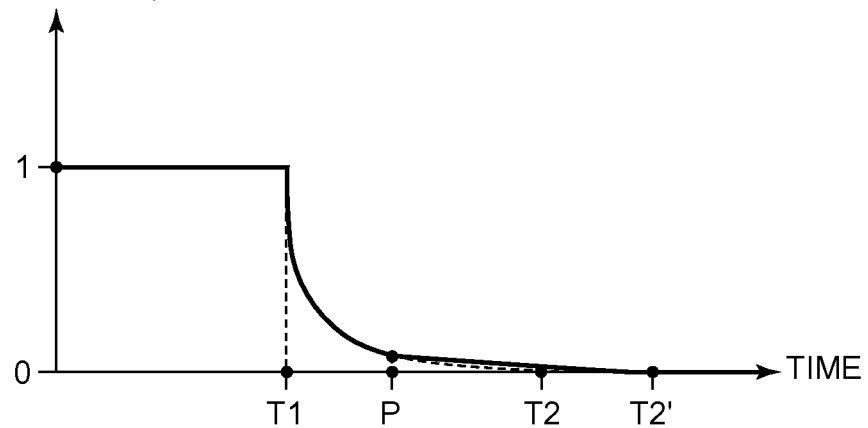
FIG. 13 is a view showing an example of a pattern of reducing the suppression degree for making a change such that a variation in the controlled variable of the steering assist device becomes gentle.

Besides, when it is determined based on the driver's follow-up operation that the driver is in an awakened state, the driving support apparatus 1 according to the present embodiment of the invention may continue control of the traveling control device by maintaining the controlled variables as shown in FIGS. 10 and 11. FIG. 10 is a view showing an example of a pattern of reducing the suppression degree for maintaining the controlled variable of the variable steering angle control device. FIG. 11 is a view showing an example of a pattern of reducing the suppression degree for maintaining the controlled variable of the steering assist device. In FIGS. 10 and 11, the driving support apparatus 1 extends the preset end time T2 of automatic driving control to the end time T2' such that automatic driving control lasts longer than the end time T2, by maintaining the controlled variable of the steering angle and the controlled variable of the steering torque for a certain time at the follow-up operation detection time point P. Besides, when it is determined based on the driver's follow-up operation that the driver is in an awakened state, the driving support apparatus 1 according to the present embodiment of the invention may continue control of the traveling control device by making a change such that the suppression degree of the controlled variable becomes gentle as shown in FIGS. 12 and 13. FIG. 12 is a view showing an example of a pattern of reducing the suppression degree for making a change such that the variation in the controlled variable of the variable steering angle control device becomes gentle. FIG. 13 is a view showing an example of a pattern of reducing the suppression degree for making a change such that the variation in the controlled variable of the steering assist device becomes gentle. In FIGS. 12 and 13, the driving support apparatus 1 extends the preset end time T2 of automatic driving control to the end time T2' such that automatic driving control lasts longer than the end time T2, by changing the variation in the suppression degree of the controlled variable of each of the steering angle and the steering torque such that the suppression degree of the controlled variable becomes gentler than the variation set prior to the follow-up operation detection time point P, at the follow-up operation detection time point P. In this manner, with the driving support apparatus 1 according to the present embodiment of the invention, a procedure of gradually reducing or gradually increasing the controlled variable from trajectory control to manual operation is carried out periodically or in accordance with decreases in the awakening degree, in order to keep the driver awake during trajectory control.

Figure 14:
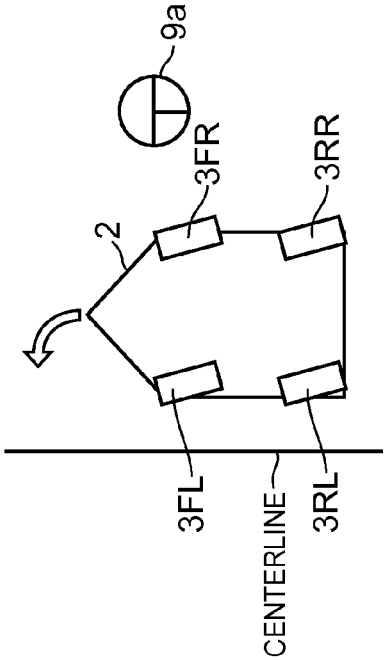
FIG. 14 is a view illustrating a detection easiness of the driver's follow-up operation in a case where control of a front is stopped.

Besides, in order to make the operation state of the driver easier to be detected, it is preferable to suppress the controlled variable in such a manner as to stop control of the front rather than to stop control of the rear, as shown in FIG. 14. FIG. 14 is a view illustrating the easiness with which the driver's follow-up operation is detected in the case where the control of the front is stopped. As shown in FIG. 14, in the case where the control of the rear is stopped (see an example in the lower left of FIG. 14), although control for the rear wheels is stopped, the vehicle 2 deflects leftward (toward a centerline side in FIG. 14), that is, in a target trajectory direction. Therefore, the driver may not turn the steering wheel 9a. In this case, the driver's follow-up operation is considered to be difficult to be detected. On the other hand, in the case where the control of the front is stopped (see an example in the lower right of FIG. 14), the control for the front wheels is stopped, so the vehicle 2 deflects rightward, that is, in the opposite direction of the target trajectory direction (toward the other side of the centerline in FIG. 14). Therefore, the driver is absolutely required to turn the steering wheel 9a in the target trajectory direction. In this case, the driver's follow-up operation is considered to be easy to be detected. That is, although the follow-up performance of the target trajectory decreases by gradually reducing the control steering angle of the front, the target trajectory can be taken along through the driver's operation. Therefore, the driver has no choice but to execute a follow-up operation (an operation of turning the steering wheel 9a to the left in an example in the lower right of FIG. 14) in order to cause the vehicle to follow the trajectory, and the awakened state of the driver can be detected though the driver's steering. Incidentally, in the example in the lower right of FIG. 14, with a view to urging the driver to perform a follow-up operation of turning the steering wheel 9a to the left, a leftward torque is applied to the steering wheel 9a. That is, in the example in the lower right of FIG. 14, with a view to urging the driver to steer to the left, the driving support apparatus 1 applies a leftward torque that is too small to turn the front wheels to the steering wheel 9a, and thereby executes control such that the driver finds it easy to steer to the left.

Thus, the driving support apparatus 1 according to the present embodiment of the invention executes control to gradually reduce the controlled variable of the front (the turning amount) when the elapsed time of automatic driving becomes equal to or longer than the first predetermined time or when the duration distance of control of the traveling control device exceeds the first predetermined distance, and to reduce the suppression degree of the amount of support in automatic driving (e.g., to return the suppression degree of the amount of support in automatic driving to a normal value) when the driver's steering operation is detected. More specifically, the ECU 7 of the driving support apparatus 1 according to the present embodiment of the invention suppresses the controlled variable of the front-wheel turning angle by the variable front-wheel turning angle control device with the controlled variable of the rear-wheel turning angle by the variable rear-wheel turning angle control device maintained, and reduces the reduced suppression degree of the controlled variable of the front-wheel turning angle by the variable front-wheel turning angle control device when a follow-up operation is detected after suppression of the controlled variable. Thus, the driving support apparatus 1 according to the present embodiment of the invention can intentionally reduce the follow-up performance of trajectory control more by stopping the control of the front than in the case where control of the rear is stopped. Therefore, a determination on the awakened state of the driver can be made more easily by determining whether or not the target trajectory can be followed through the driver's follow-up operation.

Figure 15:
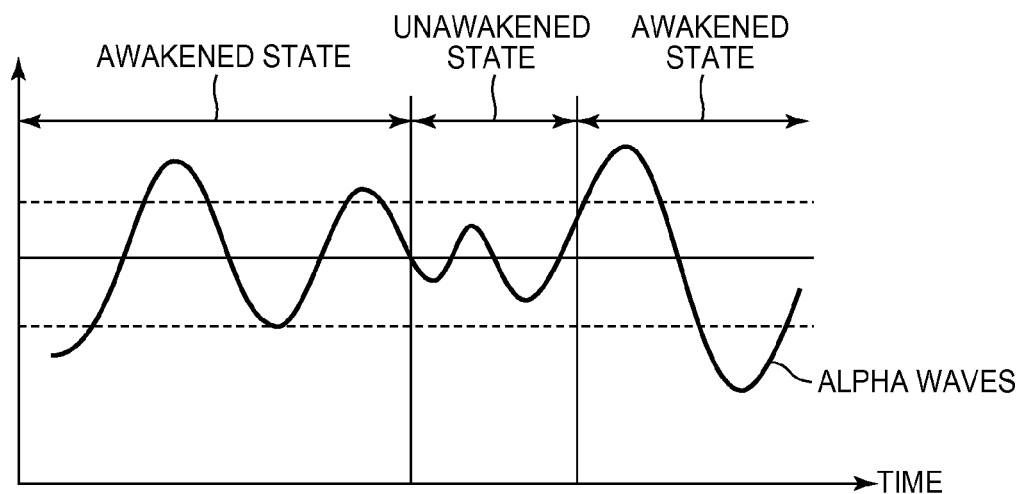
FIG. 15 is a view showing an example of a determination map of an awakening degree of the driver based on a fluctuation degree of brain waves.
Figure 16:
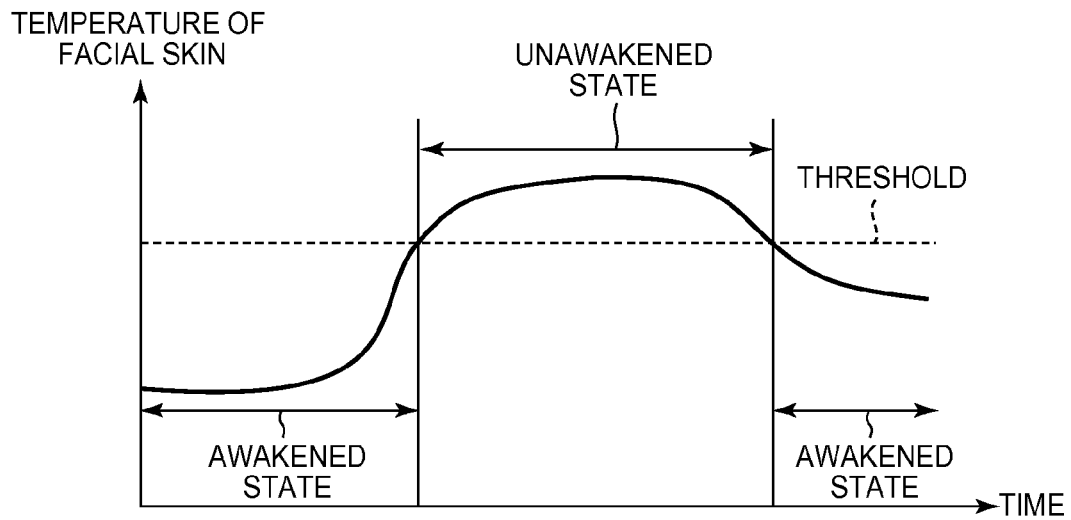
FIG. 16 is a view showing an example of a determination map of an awakening degree of the driver based on a change in temperature of a facial skin.

Besides, the driving support apparatus 1 according to the present embodiment of the invention is further equipped with an awakening degree detection device 15 (see FIG. 1) as other means for detecting the awakening degree of the driver regardless of the driver's follow-up operation. The awakening degree detection device 15 is a sensor capable of detecting the awakening state or level of the driver according to the fluctuation degree of brain waves (alpha waves) as shown in FIG. 15, or according to changes and the like in the temperature of a facial skin as shown in FIG. 16. FIG. 15 is a view showing an example of a determination map of the awakening degree of the driver based on the fluctuation degree of brain waves. FIG. 16 is a view showing an example of a determination map of the awakening degree of the driver based on changes in the temperature of a facial skin. As shown in FIG. 15, the driving support apparatus 1 according to the present embodiment of the invention determines that the driver is in an awakened state when the fluctuation degree of alpha waves detected by the awakening degree detection device 15 is large and stable, and on the other hand, determines that the driver is in an unawakened state when the fluctuation degree of alpha waves is small and unstable. Besides, the driving support apparatus 1 according to the present embodiment of the invention detects that the driver is in an awakened state when the temperature of the facial skin detected by the awakening degree detection device 15 is lower than a threshold, and on the other hand, determines that the driver is in an unawakened state when the temperature of the facial skin is high. In consequence, the ECU 7 of the driving support apparatus 1 according to the present embodiment of the invention can change over from automatic driving to manual driving by suppressing the controlled variable of the traveling control device in accordance with decreases in the awakening degree thus detected by the awakening degree detection device 15. Thus, the driving support apparatus 1 according to the present embodiment of the invention can continue to hold the driver in an awakened state and can continue safe automatic driving, by urging the driver to perform an operation when the awakening degree determined by means other than the driver's follow-up operation decreases. Incidentally, according to the present embodiment of the invention, the ECU 7 issues a warning to the driver by the warning device until the awakening degree detected by the awakening degree detection device 15 indicates an awakening degree when the awakening degree detected by the awakening degree detection device 15 indicates an unawakened state, and makes the controlled variable of the traveling control device equal to 0 after the lapse of a certain time since indication of the awakening degree as an awakened state. Besides, the ECU 7 executes control to stop the vehicle 2 at a location where the influence on traffic environments is weak, in consideration of a surrounding situation while continuing automatic driving control, when the unwakened state detected by the awakening degree detection device 15 has lasted for a certain time. In this case, the ECU 7 executes control to pull over the vehicle 2 to the right end or the left end of a traveling lane through automatic driving control, for example, with a hazard lamp blinking, and to decelerate and stop the vehicle 2 in consideration of vehicle-to-vehicle distances from preceding and following vehicles.

Figure 17:
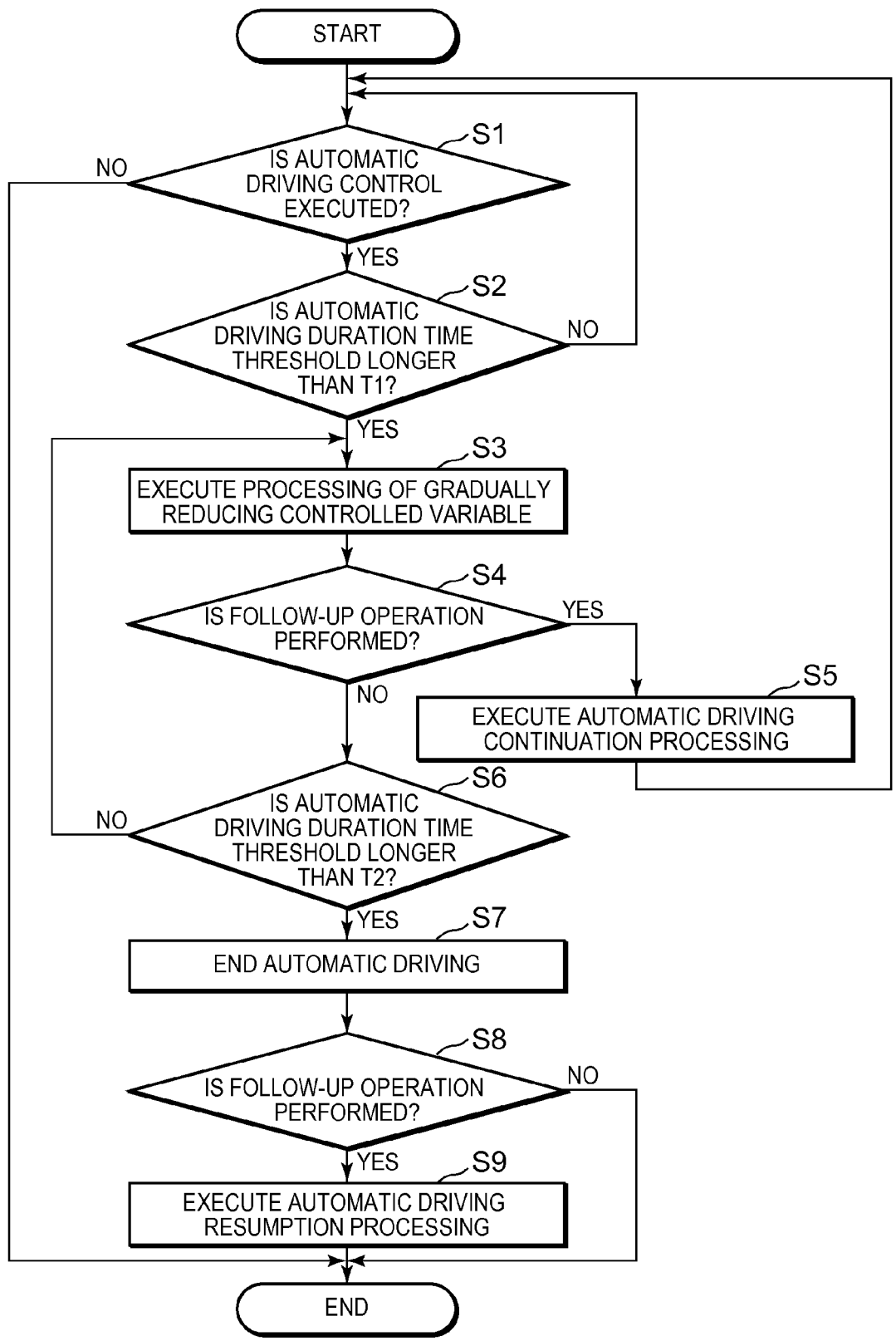
FIG. 17 is a flowchart showing an example of a processing of the driving support apparatus according to the embodiment of the invention.

Subsequently, an example of a processing that is executed in the driving support apparatus 1 configured as described above will be described with reference to FIG. 17. FIG. 17 is a flowchart showing an example of a processing by the driving support apparatus according to the embodiment of the invention. The following processing is periodically executed in the ECU 7 as the controller of the driving support apparatus 1.

As shown in FIG. 17, the driving support apparatus 1 determines whether or not the vehicle 2 is subjected to automatic driving control through control of the traveling control device (step S1). In the present embodiment of the invention, it may be determined whether or not automatic driving control is executed based on, for example, an on/off state of a predetermined changeover switch or whether or not the controlled variable of the traveling control device is equal to 0.

It should be noted herein that when it is determined in step S1 that automatic driving control is executed, the driving support apparatus 1 then shifts to a process of step S2. On the other hand, the driving support apparatus 1 ends the present processing when it is determined that automatic driving control is not executed.

Then, the driving support apparatus 1 determines whether or not a duration time of control of the traveling control device has exceeded a first predetermined time (an automatic driving duration time threshold T1) after the start of control of the traveling control device (step S2). In the present embodiment of the invention, a time point for starting control of the traveling control device may be a time point when the predetermined changeover switch is turned on by the driver or a time point when the suppression degree of the controlled variable of the traveling control device is reduced through an automatic driving continuation processing that will be described later.

It should be noted herein that when it is determined in step S2 that the duration time of control of the traveling control device has exceeded a first predetermined time (Yes in step S2), the driving support apparatus 1 shifts to a process of subsequent step S3. On the other hand, when it is determined that the duration time of control of the traveling control device has not exceeded the first predetermined time (No in step S2), the driving support apparatus 1 returns to the process of step S1.

Then, the driving support apparatus 1 executes a process of gradually reducing the controlled variable of the traveling control device (step S3) after the lapse of the automatic driving continuation time threshold T1. That is, in step S3, the driving support apparatus 1 suppresses the controlled variable of the traveling control device. In the present embodiment of the invention, as shown in FIGS. 2 and 3, it is preferable that the driving support apparatus 1 control the controlled variable of the traveling control device such that the suppression degree of the controlled variable of the steering assist device becomes larger than the suppression degree of the controlled variable of the variable steering angle control device. Besides, as shown in FIG. 14, it is preferable that the driving support apparatus 1 suppress the controlled variable of the front-wheel turning angle by the variable front-wheel turning angle control device with the controlled variable of the rear-wheel turning angle by the variable rear-wheel turning angle control device maintained, and reduce the suppression degree of the controlled variable of the front-wheel turning angle by the variable front-wheel turning angle control device when a follow-up operation is detected after suppression of the controlled variable.

Then, after suppression of the controlled variable in step S3, the driving support apparatus 1 determines whether or not the driver's follow-up operation for causing the vehicle to follow the travelable range by the vehicle control device has been detected (step S4). That is, in step S4, the driving support apparatus 1 executes a processing of making a determination on the awakening degree of the driver based on the driver's follow-up operation, as shown in FIGS. 4 and 5.

It should be noted herein that when it is determined in step S4 that the driver's follow-up operation has been detected (Yes in step S4), the driving support apparatus 1 executes an automatic driving continuation process (step S5). That is, in step S5, as shown in FIGS. 6 to 13, the driving support apparatus 1 reduces the suppression degree of the controlled variable of the traveling control device, thereby continuing control of the traveling control device. Then, the driving support apparatus 1 shifts to the process of step S1.

On the other hand, when it is determined in step S4 that the driver's follow-up operation has not been detected (No in step S4), the driving support apparatus 1 determines whether or not the duration time of control of the traveling control device has exceeded the second predetermined time (the automatic driving duration time threshold T2) that is longer than the first predetermined time (step S6). In the present embodiment of the invention, when the automatic driving continuation process is executed in step S5, the driving support apparatus 1 determines whether or not the duration time of control of the traveling control device has exceeded the automatic driving duration time threshold T2' (see FIGS. 6 to 13) extended by the automatic driving continuation process. Incidentally, according to the present embodiment of the invention, this automatic driving duration time threshold T2' is changed by the automatic driving continuation process in step S5, when the threshold T2' is equal to or shorter than a maximum value of the automatic driving duration time set in advance by the driver (e.g., 6 hours).

It should be noted herein that when it is determined in step S6 that the duration time of control of the traveling control device has exceeded the second predetermined time (Yes in step S6), the driving support apparatus 1 shifts to a process of subsequent step S7. On the other hand, when it is determined that the duration time of control of the traveling control device has not exceeded the second predetermined time (No in step S6), the driving support apparatus 1 returns to the process of step S3.

Then, the driving support apparatus 1 ends automatic driving by suppressing the controlled variable of the traveling control device such that the controlled variable of the traveling control device becomes equal to 0 at a time point when the duration time exceeds the second predetermined time that is longer than the first predetermined time after the start of control of the traveling control device (step S7). That is, in step S7, the driving support apparatus 1 ends automatic driving, and changes over to manual driving. It should be noted herein that it is preferable that the driving support apparatus 1 make the controlled variable of the traveling control device equal to 0 after warning the driver by the warning device, when the duration time has become equal to or longer than the second predetermined time, in step S7.

Then, the driving support apparatus 1 determines whether or not the driver's follow-up operation for causing the vehicle to follow the travelable range by the vehicle control device has been detected during manual driving through the driver's driving operation after the end of automatic driving in step S7 (step S8).

It should be noted herein that when it is determined in step S8 that the driver's follow-up operation has been detected (Yes in step S8), the driving support apparatus 1 executes an automatic driving resumption process for executing control to return the controlled variable of the traveling control device in such a direction as to increase from 0 (step S9). In the present embodiment of the invention, after the process of step S9, the driving support apparatus 1 resets the preset T1 and T2, ends the present processing, and repeats the processing of FIG. 17 again. On the other hand, when it is determined in step S8 that the driver's follow-up operation has not been detected (No in step S8), the driving support apparatus 1 ends the present processing.

Incidentally, in the aforementioned processing shown in FIG. 17, the example in which the driving support apparatus 1 determines, based on the duration time of control of the traveling control device, whether or not the first predetermined time or the second predetermined time has been exceeded has been described, but the invention is not limited thereto. The driving support apparatus 1 according to the present embodiment of the invention may determine, based on the duration distance of control of the traveling control device instead of the duration time of control of the traveling control device, whether or not the first predetermined distance or the second predetermined distance has been exceeded. Besides, the driving support apparatus 1 according to the present embodiment of the invention may determine, based on both the duration time and the duration distance of control of the traveling control device, whether or not both the first predetermined time and the first predetermined distance or both the second predetermined time and the second predetermined distance have been exceeded.

Besides, in the aforementioned processing shown in FIG. 17, the example in which the controlled variable of the traveling control device is suppressed after the lapse of a certain time instead of suppressing the controlled variable of the traveling control device immediately after the start of control of the traveling control device has been described, but the invention is not limited thereto. The driving support apparatus 1 according to the present embodiment of the invention may continue control of the traveling control device by suppressing the controlled variable of the traveling control device after the start of control of the traveling control device and reducing the suppression degree of the controlled variable of the traveling control device when a follow-up operation is detected after suppression of the controlled variable. In this case, the aforementioned processes of steps S2 and S6 in FIG. 17 are omitted. In this manner, the driving support apparatus 1 according to the present embodiment of the invention may execute control to suppress the controlled variable of the traveling control device until the driver's follow-up operation for causing the vehicle to follow the travelable range by the vehicle control device is detected after the start of control of the traveling control device.

Incidentally, in the aforementioned embodiment of the invention, the example in which the driver's follow-up operation for causing the vehicle to follow the travelable range is detected has been described, but the invention is limited thereto. The driving support apparatus 1 according to the present embodiment of the invention may detect an operation of the brake pedal as the driver's follow-up operation for causing the vehicle to follow the travelable range when an operation of the brake pedal is detected to prevent the vehicle from deviating from a lane.

DESCRIPTION OF REFERENCE NUMERALS

1 DRIVING SUPPORT APPARATUS
2 VEHICLE

3 WHEEL
4 DRIVE DEVICE
5 BRAKING DEVICE
6 STEERING DEVICE (TRAVELING CONTROL DEVICE)
7 ECU (CONTROL DEVICE)
9 FRONT-WHEEL STEERING DEVICE
9a STEERING WHEEL (VEHICLE CONTROL DEVICE)
9c VGRS DEVICE (VARIABLE FRONT-WHEEL TURNING ANGLE CONTROL DEVICE)
9d STEERING DRIVER (STEERING ASSIST DEVICE)
10 REAR-WHEEL STEERING DEVICE
10a STEERING DRIVER (VARIABLE REAR-WHEEL TURNING ANGLE CONTROL DEVICE)
11 WHEEL SPEED SENSOR
12 WHEEL CYLINDER PRESSURE SENSOR
13 FRONT DETECTION DEVICE (TRAVELABLE RANGE DETECTION DEVICE)
14 SPEAKER (WARNING DEVICE)
15 AWAKENING DEGREE DETECTION DEVICE

The invention claimed is:

1. A driving support apparatus comprising:
a travelable range detection device configured to detect a travelable range of a vehicle;
a traveling control device configured to control the vehicle such that the vehicle travels in the travelable range detected by the travelable range detection device;
a vehicle control device configured to control a behavior of the vehicle; and
a controller configured to control the traveling control device and configured to execute control to gradually reduce an amount of support in automatic driving until a follow-up operation which causes the vehicle to follow the travelable range is detected after start of control of the traveling control device, the follow-up operation being carried out by a driver with the vehicle control device, wherein the controller is configured to execute control to gradually reduce the amount of support in automatic driving after starting control of the traveling control device, and the controller is configured to continue controlling the traveling control device by reducing the amount of reduction of the amount of support in automatic driving when the follow-up operation is detected after reducing the amount in automatic driving.

2. The driving support apparatus according to claim 1, wherein
the controller is configured to reduce, after start of control of the traveling control device, the amount of support in automatic driving, when a duration time of control of the traveling control device exceeds a first predetermined time or when a duration distance of control of the traveling control device exceeds a first predetermined distance.

3. The driving support apparatus according to claim 2, wherein
the vehicle control device includes a steering wheel,
the traveling control device includes a steering assist device and a variable steering angle control device,
the steering assist device is configured to output a steering torque for assisting the driver in steering the steering wheel,
the variable steering angle control device is configured to vary a wheel turning angle with respect to a steering angle of the steering wheel,
the automatic driving includes a controlled variable of the steering assist device and a controlled variable of the variable steering angle control device, and
the controller is configured to make a suppression degree of the controlled variable of the steering assist device larger than a suppression degree of the controlled variable of the variable steering angle control device.

4. The driving support apparatus according to claim 3, wherein
the variable steering angle control device includes a variable front-wheel turning angle control device and a variable rear-wheel turning angle control device,
the variable front-wheel turning angle control device is configured to vary a front-wheel turning angle with respect to the steering angle,
the variable rear-wheel turning angle control device is configured to vary a rear-wheel turning angle with respect to the steering angle,
the controlled variable of the variable steering angle control device includes a controlled variable of the front-wheel turning angle by the variable front-wheel turning angle control device, and a controlled variable of the rear-wheel turning angle by the variable rear-wheel turning angle control device,
the controller is configured to suppress the controlled variable of the front-wheel turning angle with the controlled variable of the rear-wheel turning angle maintained, and
the controller is configured to reduce a suppression degree of the controlled variable of the front-wheel turning angle, when the follow-up operation is detected after the controller suppresses the controlled variable of the front-wheel turning angle.

5. The driving support apparatus according to claim 2, wherein
the controller is configured to reduce the amount of support in automatic driving to become, at a first time point or a second time point, equal to 0,
the first time point is a time point when the duration time exceeds a second predetermined time that is longer than the first predetermined time after start of control of the traveling control device,
the second time point is a time point when the duration distance exceeds a second predetermined distance that is longer than the first predetermined distance after start of control of the traveling control device.

6. The driving support apparatus according to claim 5, further comprising:
a warning device configured to issue a warning to the driver, and
the controller is configured to issue the warning to the driver with the warning device and then reduce the amount of support in automatic driving to become equal to 0, when the duration time becomes equal to or longer than the second predetermined time or when the duration distance becomes equal to or longer than the second predetermined distance.

7. The driving support apparatus according to claim 6, further comprising:
an awakening degree detection device configured to detect an awakening degree of the driver, and
the controller is configured to reduce the amount of support in automatic driving in accordance with a decrease in the awakening degree detected by the awakening degree detection device.

8. The driving support apparatus according to claim 7, wherein the controller is configured to issue, when the awakening degree detected by the awakening degree detection device indicates an unawakened state, the warning to the driver with the warning device until the awakening degree detected by the awakening degree detection device indicates an awakened state, and to then reduce, when a certain time elapses after the awakening degree indicates the awakened state, the amount of support in automatic driving to become equal to 0.

9. A driving support method that is carried out by a driving support apparatus, wherein
the driving support apparatus includes a travelable range detection device, a traveling control device, a vehicle control device, and a controller,
the travelable range detection device is configured to detect a travelable range of a vehicle,
the traveling control device is configured to control the vehicle such that the vehicle travels in the travelable range detected by the travelable range detection device, and
the vehicle control device is configured to control a behavior of the vehicle,
the driving support method comprising
a control step that is executed by the controller to reduce an amount of support in automatic driving until a follow-up operation which causes the vehicle to follow the travelable range is detected after start of control of the traveling control device, the follow-up operation being carried out by a driver with the vehicle control device wherein the control step includes reducing the amount of support in automatic driving after start of control of the traveling control device, and continuing control of the traveling control device by reducing the amount of reduction of the amount of support in automatic driving when the follow-up operation is detected after reducing the amount of support in automatic driving.

10. The driving support method according to claim 9, wherein
the control step further includes reducing, after start of control of the traveling control device, the amount of support in automatic driving when a duration time of control of the traveling control device exceeds a first predetermined time or when a duration distance of control of the traveling control device exceeds a first predetermined distance.

* * * * *